United States Patent
Hope

(10) Patent No.: US 7,664,384 B2
(45) Date of Patent: Feb. 16, 2010

(54) USER DEFINED AUTOFOCUS AREA

(75) Inventor: Julian Charles Hope, Bolton (GB)

(73) Assignee: Sony Ericsson Mobile Communications AB, Lund (SE)

( * ) Notice: Subject to any disclaimer, the term of this patent is extended or adjusted under 35 U.S.C. 154(b) by 431 days.

(21) Appl. No.: 11/557,200

(22) Filed: Nov. 7, 2006

(65) Prior Publication Data

US 2008/0107411 A1    May 8, 2008

(51) Int. Cl.
G03B 3/00 (2006.01)
G03B 13/32 (2006.01)

(52) U.S. Cl. .................................... 396/103

(58) Field of Classification Search ............... 396/103, 396/121, 123, 125; 348/333.01, 333.02, 348/333.03, 231.99, 345, 346; 345/173
See application file for complete search history.

(56) References Cited

U.S. PATENT DOCUMENTS

| 5,794,000 A | 8/1998 | Furuta |
| 6,163,652 A | 12/2000 | Sato |
| 2004/0189856 A1 * | 9/2004 | Tanaka ........................ 348/345 |
| 2004/0218086 A1 | 11/2004 | Voss et al. |
| 2007/0222859 A1 * | 9/2007 | Chang et al. ................ 348/148 |
| 2008/0080846 A1 * | 4/2008 | Grip ............................ 396/51 |

FOREIGN PATENT DOCUMENTS

| EP | 0848272 | 6/1998 |
| EP | 1017232 | 7/2000 |

OTHER PUBLICATIONS

PCT International Search Report with Written Opinion for corresponding PCT Application No. PCT/IB2007/051708, mailed Nov. 15, 2007, 14 pages.
International Preliminary Report on Patentability for corresponding international application No. PCT/IB2007/051708, mailed Feb. 2, 2009, 6 pages.

* cited by examiner

Primary Examiner—Kenneth J Whittington
(74) Attorney, Agent, or Firm—Harrity & Harrity, LLP

(57) ABSTRACT

A device allows a user to select an arbitrary portion of a scene being previewed for picture taking. In one implementation, the device includes a camera; a display to preview a scene associated with the camera; an interface configured to allow a user of the device to select a portion of the scene; and autofocus logic to adjust the focus of the camera based on the selected portion of the scene.

15 Claims, 7 Drawing Sheets

USER DEFINED AUTOFOCUS AREA

BACKGROUND

1. Technical Field of the Invention

Implementations described herein relate generally to imaging systems, and more particularly, to portable imaging devices having an autofocus feature.

2. Description of Related Art

Many portable imaging devices typically include an autofocus feature through which the device automatically adjusts the optical system of the device to obtain correct focus on a subject. In other words, the portable imaging device will automatically place the subject of interest into focus without requiring manual adjustment by the operator.

In a typical autofocus operation, a user may center the subject of interest in the frame of the picture. The imaging device may then automatically (or, in some devices, in response to a user pressing an "autofocus" button) adjust the image so that whatever is in the center portion of the image is in-focus. This type of autofocus operation can be efficient in many situations but, in some situations, can be problematic.

SUMMARY

According to one aspect, a device includes a camera; a display to preview a scene associated with the camera; an interface configured to allow a user of the device to select a portion of the scene; and autofocus logic to adjust the focus of the camera based on the selected portion of the scene.

Additionally, the autofocus logic may adjust the focus of the camera by adjusting a focal length of an optical component of the camera using image processing techniques applied to the selected portion of the scene.

Additionally, the display may include touch screen display.

Additionally, the device may include logic to allow the user to select the portion of the scene by drawing a closed or nearly closed shape on the display.

Additionally, the device may include logic to allow the user to select a location in the scene by touching the display with the stylus and logic to generate the portion of the scene based on the selected location.

Additionally, the generated portion of the scene may be generated as a rectangular area of the scene centered at the selected location.

Additionally, the generated portion of the scene is generated as a shape identified based on an object corresponding to the selected location.

Additionally, the device may include logic to overlay an icon on the scene, wherein the location of the icon is controllable to select a location in the scene, the location being used to generate the selected portion of the scene.

Additionally, the autofocus logic may adjust the focus of the camera using a passive autofocus technique.

Additionally, the autofocus logic may adjust the focus of the camera using an active autofocus technique.

Additionally, the device may be a mobile phone.

In another aspect, a method includes displaying a scene from a camera; receiving a selection of a portion of the scene from a user; and adjusting an optical component of the camera to optimize focus of the camera at the selected portion of the scene.

Additionally, the method may include capturing an image of the scene in response to a command from the user; and storing the captured image.

Additionally, the receiving selection of a portion of the scene from the user may include receiving a shape drawn by the user on a display on which the scene is displayed and generating the portion of the scene based on the shape.

Additionally, the shape may be a closed or nearly closed shape.

Additionally, receiving selection of a portion of the scene from the user may include receiving selection of a location specified by touching a display and generating the portion of the scene based on the selected location.

Additionally, the generated portion of the scene may be generated as a rectangular area within the scene and centered at the selected location.

Additionally, adjusting the optical component of the camera may be based on passive autofocusing techniques.

Additionally, adjusting the optical component of the camera may be based on active autofocusing techniques.

According to another aspect, a device may include means for displaying a scene from a camera; means for receiving selection of a portion of the scene from a user; and means for adjusting an optical component of the camera based on the selected portion of the scene.

Additionally, the means for receiving may further include means for receiving a shape drawn by the user on the means for displaying; and means for generating the portion of the scene based on the shape.

Additionally, the means for receiving may further include means for receiving selection of a location specified by touching the display; and means for generating the portion of the scene based on the selected location.

Additionally, the device may include a mobile terminal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

As described herein, a portable imaging device, such as a portable communication device, includes a camera autofocus feature in which the user may, if desired, select an arbitrary portion of a selected camera scene to which the autofocus operation is to be applied.

Allowing a user to select a portion of a scene for autofocusing can be particularly useful in a number of situations. For example, if the portable imaging device is attached to a tripod and the subject is located off to one side in the scene, the user can instruct the portable imaging device to autofocus based on the position of the subject without physically moving the portable imaging device. As another example, consider the situation in which the camera lens is remote to the user or to the camera phone body (e.g., such as via a short range wireless connection). In this situation, it may also be desirable to change the autofocus area while maintaining a fixed camera lens position.

Exemplary Devices

Figures 1A, 1B:
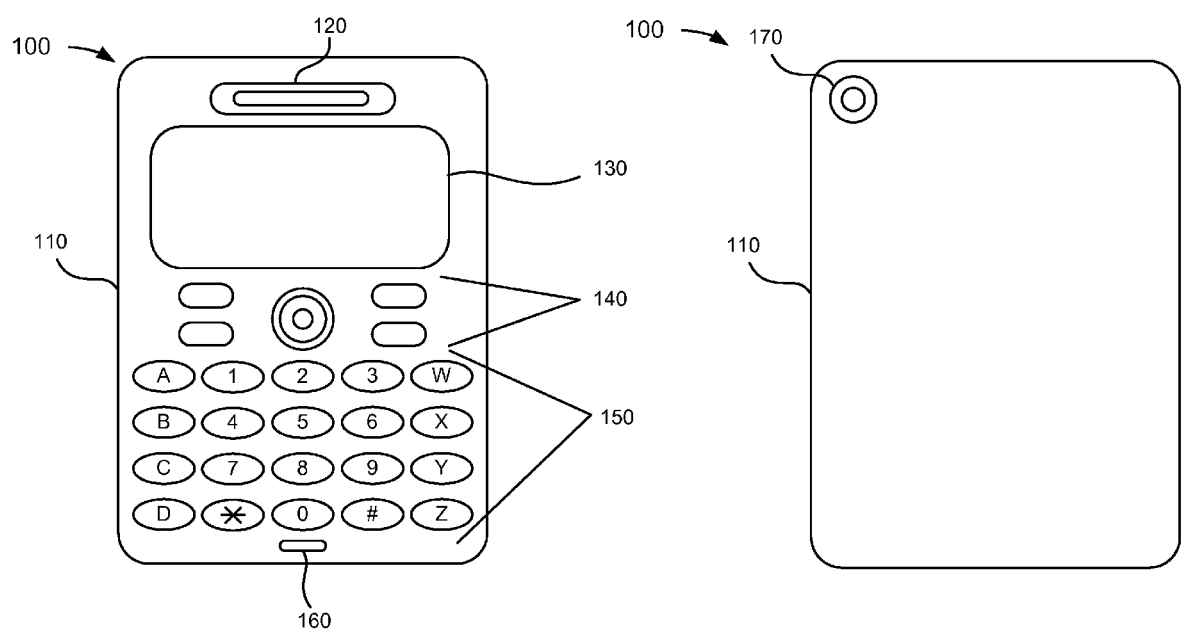
FIG. 1A is a front side view of an exemplary electronic device.
FIG. 1B is a back side view of the exemplary electronic device.

FIGS. 1A and 1B are diagrams of an exemplary portable imaging device 100 in which embodiments described herein may be implemented. In this example, portable imaging device 100 is a mobile phone. FIG. 1A illustrates the front of device 100 and FIG. 1B illustrates the back of device 100. As used herein, a "device" may include a mobile telephone (e.g., a radiotelephone); a personal communications system (PCS) terminal that may combine a cellular radiotelephone with data processing, facsimile, and/or data communications capabilities; a personal digital assistant (PDA) that may include a radiotelephone, pager, Internet/intranet access, web browser, organizer, calendar, and/or global positioning system (GPS) receiver; a laptop; a GPS device; a computer; an MP3 player; a pager; a digital camera; a video camera; binoculars; a telescope; and/or any other device including a camera.

Device 100 may include housing 110, speaker 120, display 130, control keys 140, keypad 150, microphone 160, and camera 170 (FIG. 1B). Housing 110 may protect the components of device 100 from outside elements. Housing 110 may be made from thermoplastics, metals, elastomers (e.g., synthetic rubber and/or natural rubber), and/or other similar materials. Speaker 120 may provide audible information to a user of device 100. Display 130 may provide visual information to the user. For example, display 130 may provide information regarding incoming or outgoing telephone calls, games, telephone numbers, the current time, e-mail, etc. Control keys 140 may permit the user to interact with device 100 to cause device 100 to perform one or more operations. Keypad 150 may include a standard telephone keypad and may include additional keys to enable typing information into device 100. Microphone 160 may receive audible information from the user.

Camera 170 may enable device 100 to capture and/or store video and/or images (e.g. pictures) of a scene being viewed through the lens of camera 170. Camera 170 may be on the front side of device 100 (not shown) and/or the rear side of device 100 (as shown in FIG. 1B). Control keys 140 may include, for example, a shutter key (not shown) for enabling the user to take a picture with camera 170. Display 130 may display captured or stored video and/or images. Camera 170 may be an electronic device that may capture and/or store images and/or video digitally.

Figure 2:
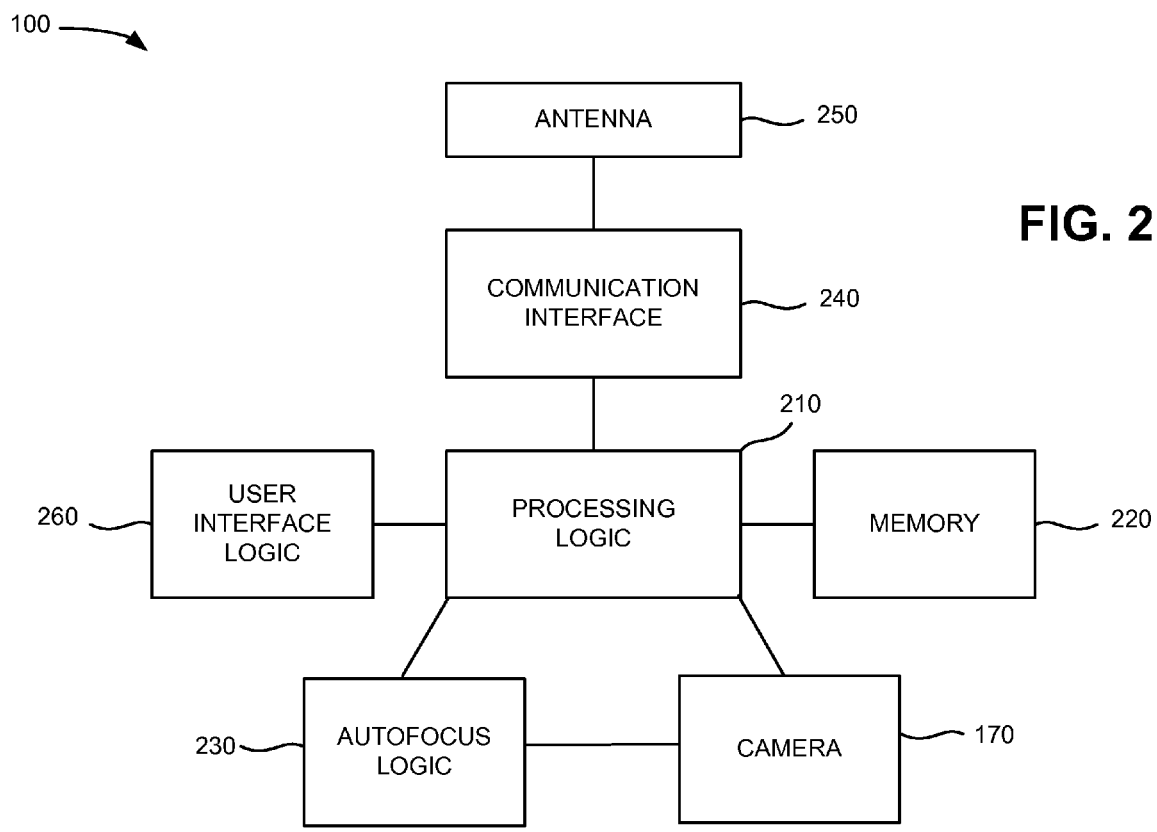
FIG. 2 is a diagram of exemplary conceptual components of the system architecture of the device shown in FIGS. 1A and 1B.

FIG. 2 is a diagram of exemplary conceptual components of the system architecture of device 100 of FIGS. 1A and 1B. As shown in FIG. 2, device 100 may include processing logic 210, memory 220, communication interface 240, antenna 250, user interface logic 260, camera 170, and autofocus logic 230. Processing logic 210 may include a processor, microprocessor, an application specific integrated circuit (ASIC), or a field programmable gate array (FPGA). Processing logic 210 may include data structures or software programs to control operation of device 100 and its components. Memory 220 may include a hard disk drive (HDD), a random access memory (RAM), a read only memory (ROM), flash memory, a removable memory, and/or another type of memory to store data and/or instructions that may be used by processing logic 210, e.g., any type of a computer-readable medium. Camera 170 may store captured video and/or images, e.g., pictures, in memory 220. Display 130 may display stored video and/or images, e.g., pictures, from memory 220.

Communication interface 240 may include, for example, a USB port for communication over a cable. Communication interface 240 may include a transmitter that may convert baseband signals from processing logic 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna 250 for transmission and reception of the RF signals. Antenna 250 may include one or more antennas to transmit and receive RF signals over the air. Antenna 250 may receive RF signals from communication interface 240 and transmit them over the air and receive RF signals from over the air and provide them to communication interface 240. Communication interface 240 may incorporate the Bluetooth standard or a USB serial port standard.

User interface logic 260 may include mechanisms for inputting information into device 100 and/or for outputting information from device 100. Examples of input and output mechanisms may include speaker 120 to output audio signals, microphone 160 to receive audio signals, keys 140 or 150 to permit data and control commands to be input, and/or display 130 to output visual information. Display 130 may show content, such as pictures or videos. Speaker 120 may play content, such as music or radio programming. User interface logic 260 may also include a vibrator mechanism that causes device 100 to vibrate when, for example, an incoming telephone call is received. User interface logic 260 may allow the user to receive a menu of options. The menu may allow the user to select various functions or modes associated with applications executed by device 100. User interface logic 260 may allow the user to activate a particular mode, such as a mode defined by an application running in device 100.

Autofocus logic 230 may interact with camera 170 to perform autofocusing operations relating to the optical components of camera 170. Autofocus logic 230 may be implemented in hardware, software, or a combination of hardware and software. Although illustrated as a separate component from camera 170, autofocus logic 230 could equivalently be considered as integrated within camera 170.

Techniques for automatically determining an optimal focal length for a lens (i.e., autofocus techniques) are generally known. One such set of techniques, referred to as passive autofocus techniques, is based on an analysis, using image processing techniques, of a portion of the scene in the optical system of the camera. Such techniques may, for example, calculate the high-frequency components of the portion of the scene over different focal lengths of the camera lens. The camera lens position corresponding to maximum value of the high frequency components corresponds to the optimal focal length.

Other passive autofocus techniques, such as those based on image phase detection are also known.

Active autofocus techniques are also known. Active autofocus systems may measure distance to the subject independently of the optical system and then adjust the optical focal length based on the measured distance. Active autofocus systems may use, for example, ultrasonic sound waves or infrared light to measure distance.

Autofocus logic 230 will be primarily described herein as implemented as a passive autofocus system, although it can be appreciated that concepts similar to those described herein may be implemented with an active autofocus system or other suitable autofocus systems.

Autofocus Logic

Figure 3:
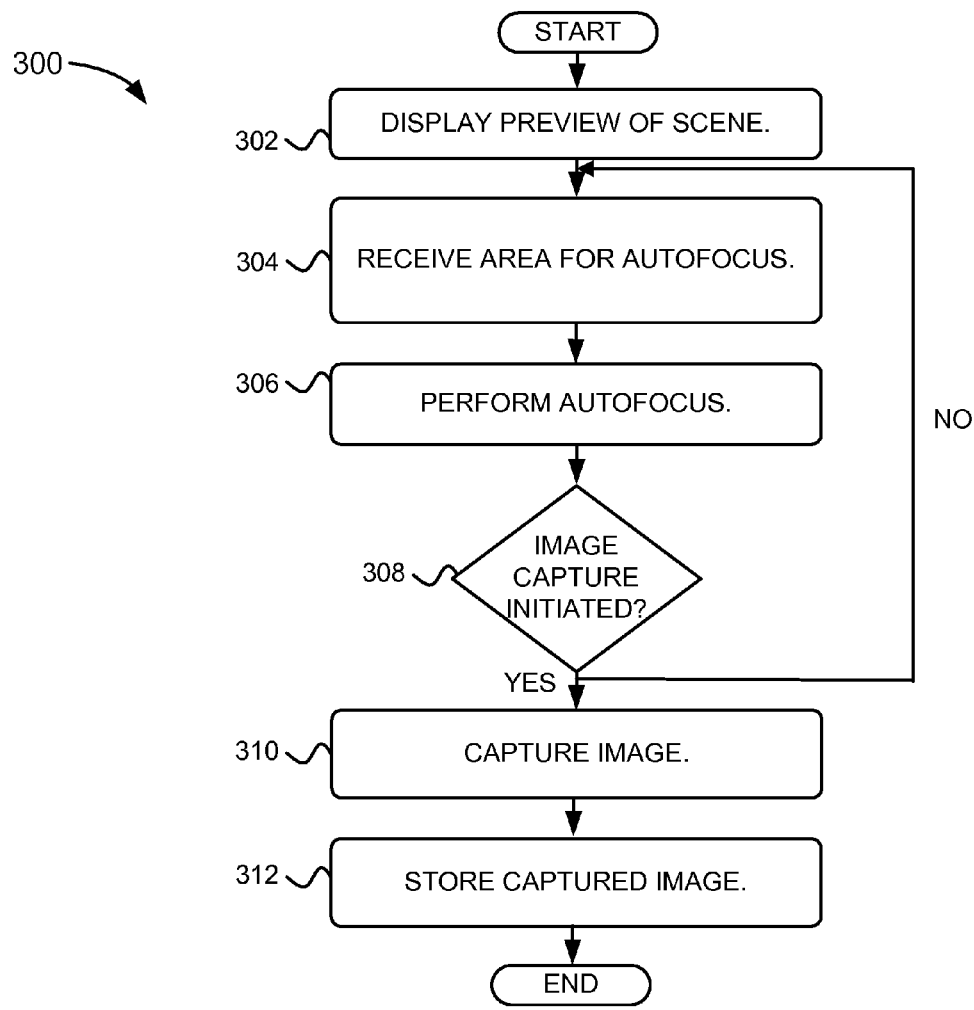
FIG. 3 is a flow chart illustrating exemplary operations for autofocusing a scene for an electronic device.

As mentioned, autofocus logic 230 may perform autofocusing operations to assist in taking images with camera 170. FIG. 3 is a flow chart illustrating exemplary operations for autofocusing a scene for camera 170.

When a user of device 100 is interested in taking a picture with camera 170, the user may control or otherwise manipulate device 100 so that it is available to take a picture. For example, to put device 100 into picture taking mode, the user may activate a pre-designated picture taking button or select a picture taking mode through a graphical interface presented on display 130. In response, device 100 may begin to show, in display 130, the scene that is currently incident upon the lens of camera 170 (act 302). In other words, device 100 may allow the user to preview the scene (i.e., the picture) that the user is about to take.

Figure 4:
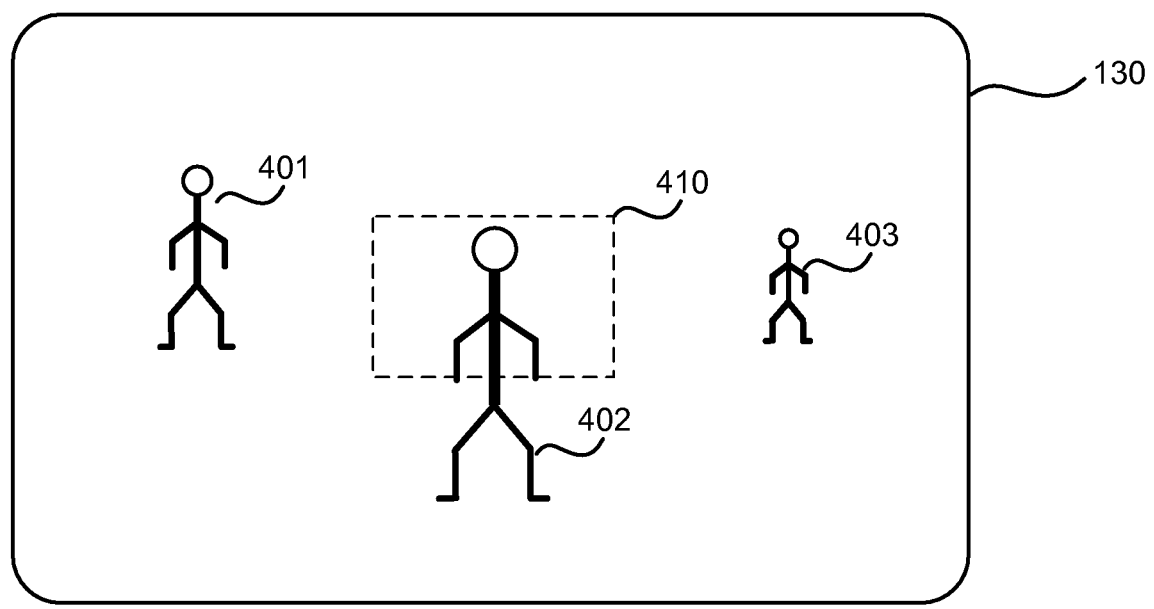
FIG. 4 is a diagram illustrating an exemplary scene shown in the display of an electronic device.

Autofocus logic 230 may attempt to continuously optimize the focus of the scene being previewed (acts 304, 306, and 308). More specifically, autofocus logic 230 may receive an autofocus area that corresponds to a portion of the scene for which the focus is to be optimized (act 304) and attempt to optimize the focus based on this area (act 306). In one implementation, autofocus logic 230 may initially assume that the selected portion of the image is a center portion of the image. FIG. 4 is a diagram illustrating an exemplary scene shown in display 130. As shown, display 130 may display the scene currently in view of camera 170. In this example, the scene includes three people 401, 402, and 403. Autofocus logic 230 may, by default, assume that the intended subject of the image is located in the center of the image, i.e., person 402 in this example. Accordingly, autofocus logic 230 may change the focal length of the camera lens system to focus the image based on a center area or portion of the scene, illustrated by box 410. In some implementations, box 410 may not be explicitly shown on display 130.

Figure 5:
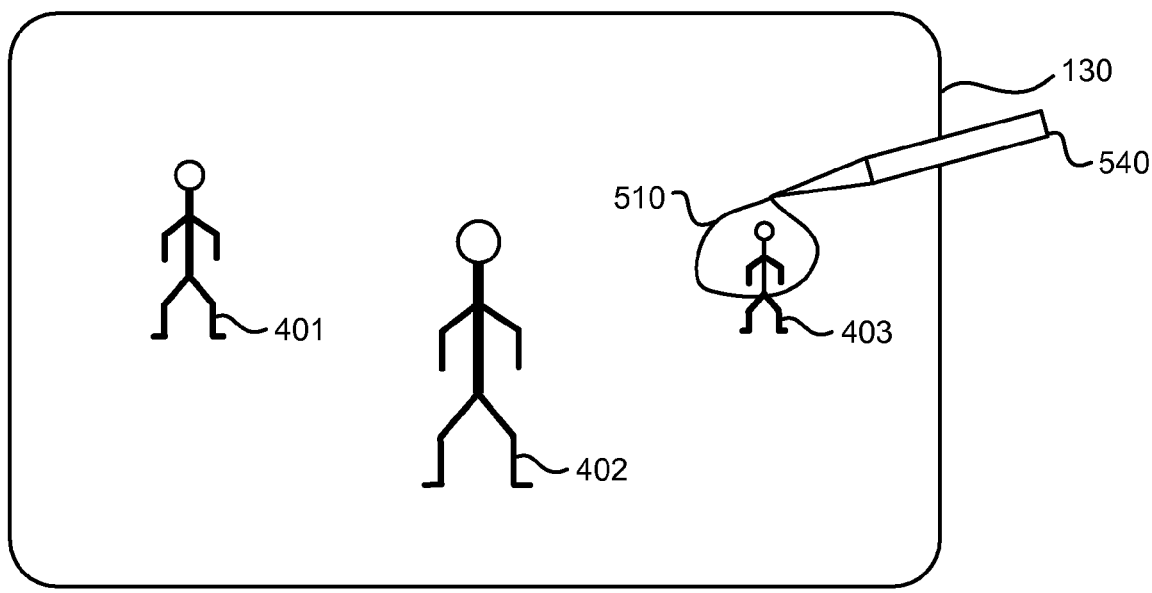
FIG. 5 is a diagram illustrating an exemplary technique through which a user can change the portion of the scene used for autofocusing.

The user may, if desired, change the selected portion of the scene for which autofocusing is applied, resulting in a new autofocus area (act 304). For example, in an implementation in which device 100 includes a stylus and the display is a touch-sensitive display, the user may select the portion of the scene on which to autofocus by drawing on display 130. FIG. 5 is a diagram illustrating an exemplary technique through which a user can change the portion of the scene used for autofocusing. The exemplary scene shown on display 130 in FIG. 5 is identical to that shown in FIG. 4. In this example, however, the user has selected a roughly circular area 510 using a stylus 540. Circular area 510 may be drawn at any position within display 130 by the user.

Autofocus logic 230 may adjust the focus based on the portion of the scene defined by circular area 510 (act 306). In other words, in this example, autofocus logic 230 will focus based on person 403 rather than person 402. This can be useful in the situation in which the user would like to take a picture of the entire scene shown in FIG. 5 but focus on a subject (e.g., person 403) that is not centered in the scene. It can be appreciated that area 510 is not necessarily limited to being circular. The user could, for example, draw a rectangular shaped area or any other closed or nearly closed shape that autofocus logic 230 can use to perform an autofocus operation. The user may, for example, outline a "humanoid" shape around person 403 to thus select person 402 for autofocusing.

Figure 6:
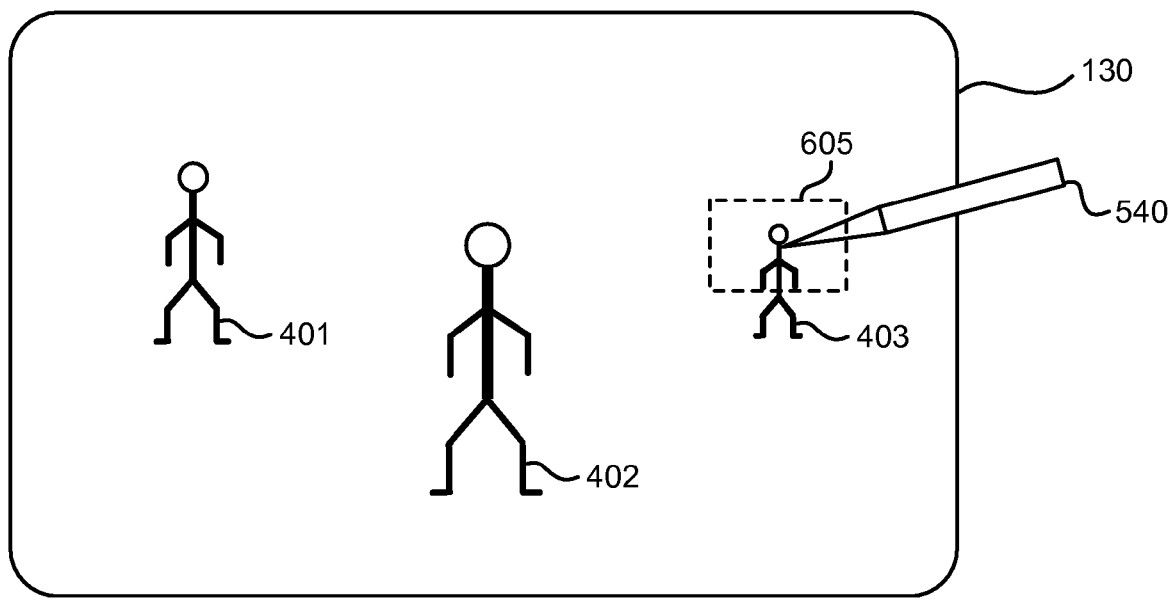
FIG. 6 is a diagram illustrating an alternate exemplary technique through which a user can change the portion of the scene used for autofocusing.

FIG. 6 is a diagram illustrating an alternate exemplary technique through which a user can change the portion of the scene used for autofocusing. The exemplary scene shown on display 130 in FIG. 6 is identical to that shown in FIGS. 4 and 5. In this implementation, assume that a device 100 includes a stylus 540 and display 130 is a touch-sensitive display. The user may select the portion of the scene on which to autofocus by tapping or otherwise touching display 130. In response, device 100 may use the touched point as the center of the area corresponding to the autofocus area. In some implementations, device 100 may draw a rectangle or other shape centered at the touched point to visually show the user the area selected for autofocusing. This is shown in FIG. 6, in which a rectangle 605 is illustrated in display 130. In other implementations, device 100 may use the touched point as the center of the area corresponding to the autofocus area without explicitly showing the area to the user.

Figure 7:
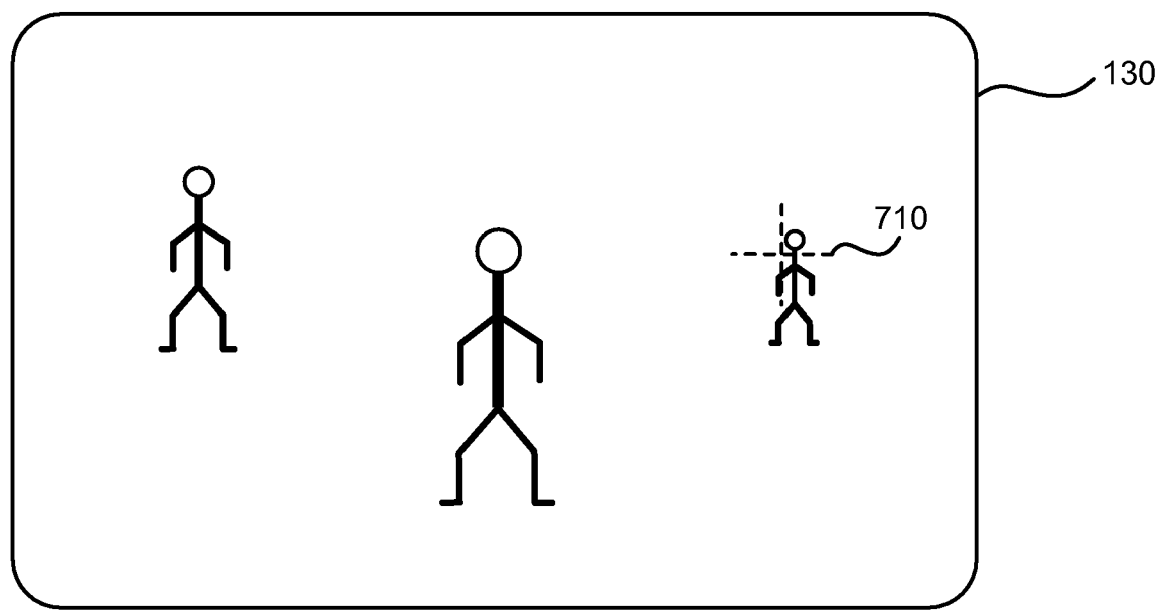
FIG. 7 is a diagram illustrating an alternate exemplary technique through which a user can change the portion of the scene used for autofocusing.

FIG. 7 is a diagram illustrating yet another exemplary technique through which a user can change the portion of the scene used when autofocusing. In this example, a stylus and a touch-sensitive display are not necessary. Instead, the user may select the area corresponding to the autofocus area through, for example, keypad 150 of device 100. Device 100 may, for instance, display a cross-hair icon 710 on display 130. The user may move cross-hair icon 710 by pressing various buttons on keypad 150 (e.g., "2," "6", "8", and "4" may correspond to up, right, down, and left, respectively; alternatively, a designated direction pad or joystick may be used to receive user movement selections). When cross-hair icon 710 is at the position on display 130 desired by the user, the user may press another button to select that position. In response, device 100 may use the selected point as the center of the area corresponding to the autofocus area. In some implementations, device 100 may draw a rectangle or other shape centered at the selected point to visually show the user the area corresponding to the autofocused area, similar to area 605 shown in FIG. 6.

Referring back to FIG. 3, when the user selects an arbitrary area on display 130 for autofocusing, autofocus logic 230 may adjust the focal length of camera 170 based on the selected area (act 306). For example, autofocus logic 230 may adjust the focal length to maximize the high frequency components in the image corresponding to the selected area. In this manner, device 100 autofocuses on an area chosen by the user. At some point the user may be satisfied with the scene being previewed in display 130 and may decide to "take" the picture by, for example, pressing a button or otherwise controlling device 100 to capture an image. In response, device 100 may capture the image of the scene (acts 308 and 310). Device 100 may also store the captured image for later retrieval and viewing by the user (act 312). The image may be stored, for example, in memory 220.

The above description relating to FIGS. 4-6 describe a number of implementations for allowing a user to arbitrarily select a portion of a scene for which an autofocus operation is applied. It can be appreciated that other alternatives are possible. For example, instead of using a stylus to interact with display 130, display 130 may allow the user to interact with it by touch. Additionally, instead of device 100 automatically generating a rectangle or other closed shape, such as rectangle 605, around a point selected by the user, device 100 may use more sophisticated image analysis techniques to determine the object that is of interest to the user. For example, in response to the user touching a person in a scene, device 100 may use image processing techniques to recognize the boundaries of the touched person and to use that shape for autofocusing.

Further, although the implementation of autofocus logic 230 was generally described with respect to using passive autofocusing techniques, active autofocusing techniques could also be used. For example, assume that an active autofocus system is implemented with an ultrasonic transceiver to measure distance to a target object. The ultrasonic transceiver may be aimed based on the portion of the scene selected by the user.

CONCLUSION

As described above, a user may select an arbitrary portion of a scene being previewed for picture taking. The selected portion of the scene is used to implement an image autofocus operation. In this manner, the user is given increased flexibility and control over pictures that the user is taking.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 3, the order of the acts may be modified in other implementations consistent with principles of the invention. Further, non-dependent acts may be performed in parallel.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed:

1. A device comprising:
   a camera;
   a display to preview a scene associated with the camera;
   an interface to receive a selected portion of the scene from a user; and
   a processor to:
      recognize boundaries of a shape in the scene using image processing techniques, where the shape includes the selected portion,
      select the shape based on the recognized boundaries, and
      adjust a focus of the camera based on the selected shape.

2. The device of claim 1, where the processor adjusts the focus of the camera by adjusting a focal length of an optical component of the camera using image processing techniques applied to the selected portion of the scene.

3. The device of claim 1, where the display includes a touch-screen display.

4. The device of claim 3, where the processor is further to:
   allow the user to select a portion of the scene by touching the display with a stylus or a finger.

5. The device of claim 1, where the processor is further to:
   overlay an icon on the scene, where the location of the icon is controllable to select the portion of the scene.

6. The device of claim 1, where the processor is to adjusts the focus of the camera using a passive autofocus technique.

7. The device of claim 1, where the processor is to adjusts the focus of the camera using an active autofocus technique.

8. The device of claim 1, where the device is a mobile phone.

9. A method comprising:
   displaying, by a display device coupled to a camera, a scene from the camera;
   receiving, by an input device coupled to the camera, a selection of a portion of the scene from a user on the display device;
   processing, using a processor associated with the camera, the scene to recognize boundaries of a shape in the scene using image processing techniques, where the shape includes the selected portion,
   selecting, using the processor the shape based on the recognized boundaries; and
   adjusting, using the processor, an optical component of the camera to optimize focus of the camera at the selected shape.

10. method of claim 9, further comprising:
    capturing an image of the scene in response to a command from the user; and
    storing the captured image.

11. The method of claim 9, where the shape is a humanoid shape.

12. The method of claim 9, where adjusting the optical component of the camera is based on passive autofocusing techniques.

13. The method of claim 9, where adjusting the optical component of the camera is based on active autofocusing techniques.

14. A device comprising:
    means for displaying a scene from a camera;
    means for receiving a selection of a portion of the scene from a user;
    means for recognizing boundaries of a shape in the scene using image processing techniques, where the shape includes the selected portion;
    means for selecting the shape based on the recognized boundaries; and
    means for adjusting an optical component of the camera based on the selected shape.

15. The device of claim 14, where the device includes a mobile terminal.

* * * * *

UNITED STATES PATENT AND TRADEMARK OFFICE
CERTIFICATE OF CORRECTION

PATENT NO. : 7,664,384 B2  Page 1 of 1
APPLICATION NO. : 11/557200
DATED : February 16, 2010
INVENTOR(S) : Julian Charles Hope It is certified that error appears in the above-identified patent and that said Letters Patent is hereby corrected as shown below:

Column 8, line 32, after "10." insert --The--.

Signed and Sealed this

Twenty-third Day of March, 2010

David J. Kappos
*Director of the United States Patent and Trademark Office*